(12) United States Patent
Yun

(10) Patent No.: US 7,608,957 B2
(45) Date of Patent: Oct. 27, 2009

(54) SPINDLE MOTOR WITH OIL IMPREGNATED BEARINGS AND A SHAFT WITH A GROOVE

(75) Inventor: Gi Seok Yun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 87 days.

(21) Appl. No.: 11/763,954

(22) Filed: Jun. 15, 2007

(65) Prior Publication Data

US 2007/0290561 A1 Dec. 20, 2007

(30) Foreign Application Priority Data

Jun. 16, 2006 (KR) ...................... 10-2006-0054344

(51) Int. Cl.
*H02K 5/16* (2006.01)
(52) U.S. Cl. ...................................................... 310/90
(58) Field of Classification Search .................. 310/90, 310/67 R; 360/99.08; 384/107, 113, 119, 384/110, 115
See application file for complete search history.

(56) References Cited

U.S. PATENT DOCUMENTS

| | | | |
|---|---|---|---|
| 3,915,519 A * | 10/1975 | Lautner et al. .............. 384/412 |
| 5,227,686 A * | 7/1993 | Ogawa ......................... 310/90 |
| 5,347,189 A * | 9/1994 | Chuta et al. .................... 310/90 |
| 5,715,116 A * | 2/1998 | Moritan et al. ............ 360/99.08 |
| 5,945,751 A * | 8/1999 | Hans et al. .................. 310/67 R |
| 7,025,505 B2 * | 4/2006 | Komori et al. ............... 384/107 |
| 7,210,850 B2 * | 5/2007 | Kusaka et al. ............... 384/107 |
| 2008/0089626 A1 * | 4/2008 | Gotoh et al. ................. 384/113 |
| 2008/0112306 A1 * | 5/2008 | Hirata et al. ................. 369/269 |

FOREIGN PATENT DOCUMENTS

| | | |
|---|---|---|
| JP | 11-002235 | 1/1999 |
| KR | 10-2005-0035731 | 4/2005 |

* cited by examiner

*Primary Examiner*—Chandrika Prasad
(74) *Attorney, Agent, or Firm*—Saliwanchik, Lloyd & Saliwanchik

(57) ABSTRACT

A spindle motor can include a base, a bearing housing supported by the base, a bearing installed in the bearing housing, where oil is impregnated in the bearing, a rotating shaft rotatably installed in the bearing and having a groove at a predetermined surface thereof facing the bearing, a stator installed around the bearing housing and having a core and a coil, and a rotor fixed to the rotating shaft and having a rotor yoke and a magnet.

20 Claims, 4 Drawing Sheets

SPINDLE MOTOR WITH OIL IMPREGNATED BEARINGS AND A SHAFT WITH A GROOVE

CROSS-REFERENCE TO RELATED APPLICATION

The present application claims the benefit under 35 U.S.C. § 119 of Korean Patent Application No. 10-2006-0054344, filed Jun. 16, 2006, which is hereby incorporated by reference in its entirety.

BACKGROUND

In general, a spindle motor is applicable for various electronic appliances. For instance, the spindle motor can be used to rotate an optical disk such that data can be recorded on the optical disk or can be read out from the optical disk.

BRIEF SUMMARY

The disclosure provides embodiments of a spindle motor.

An embodiment provides a spindle motor capable of reducing power consumption.

An embodiment provides a spindle motor that can be used for a long time. A spindle motor according to an embodiment can have an extended life compared to some related spindle motors.

A spindle motor according to an embodiment can include a base, a bearing housing supported by the base, a bearing installed in the bearing housing, the bearing having oil impregnated therein, a rotating shaft rotatably installed in the bearing and having a groove at a predetermined surface thereof facing the bearing, a stator installed around the bearing housing and having a core and a coil, and a rotor fixed to the rotating shaft and having a rotor yoke and a magnet.

DETAILED DESCRIPTION

Hereinafter, embodiments of a spindle motor will be described in detail with reference to accompanying drawings.

Figure 1:
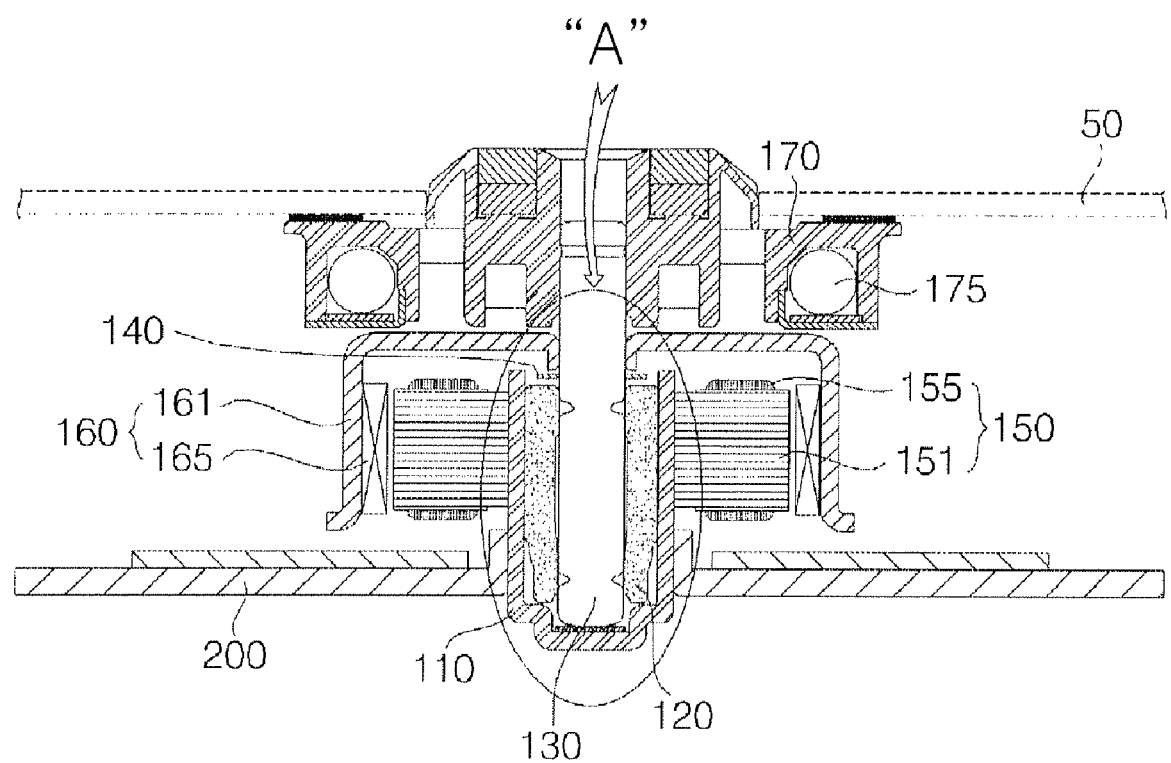
FIG. 1 is a sectional view of a spindle motor according to an embodiment.
Figure 2:
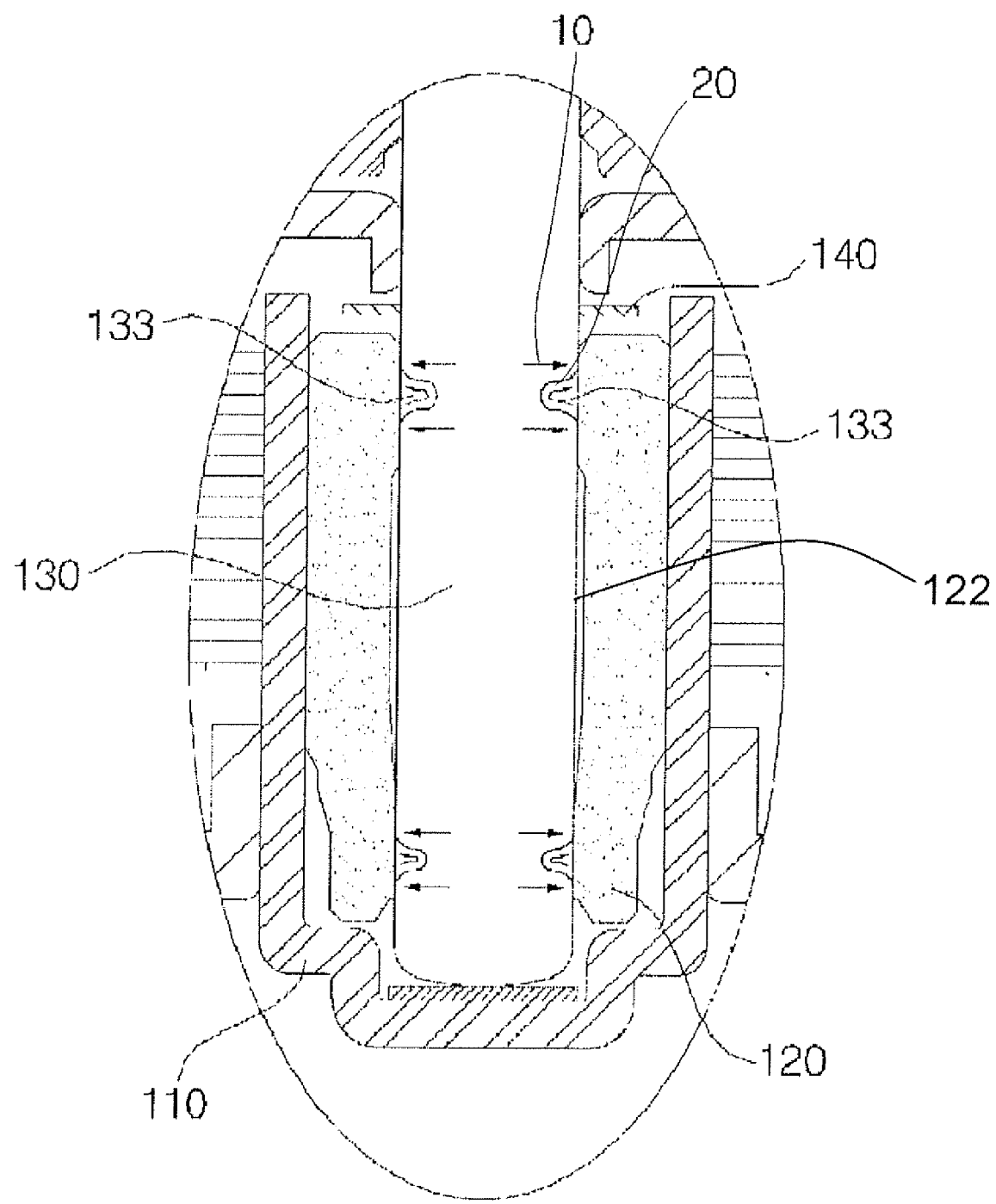
FIG. 2 is an enlarged view of "A" shown in FIG. 1.

FIG. 1 is a sectional view of a spindle motor according to an embodiment, and FIG. 2 is an enlarged view of "A" shown in FIG. 1.

As shown in FIGS. 1 and 2, the spindle motor according to an embodiment can include a bearing housing 110 having the cylindrical structure with an opened upper surface and being installed on a base 200.

The lateral surface of the bearing housing 110 can be integrally formed with the bottom surface of the bearing housing 110.

A ring-shaped bearing 120 having a predetermined height can be press-fitted into the bearing housing 110, where the upper surface of the bearing 120 is lower than the upper surface of the bearing housing 110.

The bearing 120 can be fabricated through a sintering process. The sintered bearing can be formed with a plurality of pores into which oil is impregnated.

A rotating shaft 130 can be installed in the bearing 120 and rotatably supported by the bearing 120 while making contact with the inner wall of the bearing 120. In addition, a groove 122 can be formed in the inner wall of the bearing 120 so that a gap is formed between the bearing 120 and the rotating shaft 130.

As the rotating shaft 130 rotates, oil comes out of the pores and flows into an interfacial surface between the bearing 120 and the rotating shaft 130, thereby forming an oil layer. The oil layer facilitates rotation of the rotating shaft 130.

A stopper 140 can be provided around the outer peripheral surface of the rotating shaft 130 protruding upward from the bearing 120. The stopper 140 can inhibit oil from being leaked out of the bearing housing 110 by blocking oil that comes out of the bearing 120 and flows along the interfacial surface between the rotating shaft 130 and the bearing 120 as the rotating shaft 130 rotates.

The stopper 140 can be positioned below the upper surface of the bearing housing 110.

A stator 150 having a core 151 and a coil 155 can be fixedly installed around the outer surface of the bearing housing 110. In an embodiment, stator 150 can be fixedly supported on the base 200.

In addition, a rotor 160 having a rotor yoke 161 and a magnet 165 can be fixedly installed around the rotating shaft 130 corresponding to the upper portion of the bearing housing 110.

Thus, as current is applied to the coil 155, the magnet 165 is rotated due to interaction between an electric field generated from the coil 155 and a magnetic field generated from the magnet 165, so the rotor yoke 161 and the rotating shaft 130 are also rotated.

In addition, a turntable 170 can be fixed to the rotating shaft 130 at a position corresponding to the upper portion of the rotor 160 in order to mount a disk 50 thereon. In one embodiment, the turntable 170 can have a plurality of balls 175 to reduce vibration of the spindle motor caused by eccentricity.

If a contact area between the rotating shaft 130 and the bearing 120 is too large, frictional force may increase, so a great amount of current may be necessary to drive the spindle motor.

In addition, as the rotating shaft 130 rotates, load is applied to a predetermined portion of the bearing 120 that makes contact with the rotating shaft 130 due to centrifugal force, so oil may flow out from the predetermined portion of the bearing 120.

According to an embodiment, a groove can be formed in the rotating shaft 130 of the spindle motor in order to reduce friction between the bearing 120 and the rotating shaft and to inhibit oil, which flows out from the bearing 120 due to load applied to the bearing 120 from the rotating shaft 130 caused by centrifugal force, from moving upward along the interfacial surface between the bearing 120 and the rotating shaft 130.

The groove can be formed at several spots of the rotating shaft 130 facing the bearing 120.

In an embodiment, the groove can be prepared in the form of a ring-shaped recess 133 that is formed along an outer peripheral surface of the rotating shaft 130 making contact with the bearing 120.

The ring-shaped recess 133 can have a curved sectional shape.

In an embodiment, the width of the ring-shaped recess 133, which is defined in the direction parallel to the rotating shaft 130, may be gradually reduced toward the radial center of the rotating shaft 130.

In this case, oil can be readily introduced into and discharged from the ring-shaped recess 133.

Due to the ring-shaped recess 133 formed in the rotating shaft 130, the contact area between the rotating shaft 130 and the bearing 120 can be reduced, so that friction between the rotating shaft 130 and the bearing 120 can be reduced. Therefore, power consumption can be reduced when driving the spindle motor.

In addition, oil that flows out from the bearing 120 and moves upward along the interfacial surface between the bearing 120 and the rotating shaft 130 can be stored in the recess 133 and again supplied to the bearing 120 due to tare thereof, so that oil can be inhibited from being leaked.

Reference numeral 10 represents the direction of load applied to the bearing 120 from the rotating shaft 130, and reference numeral 20 represents the moving direction of oil in the recess 133.

Figure 3:
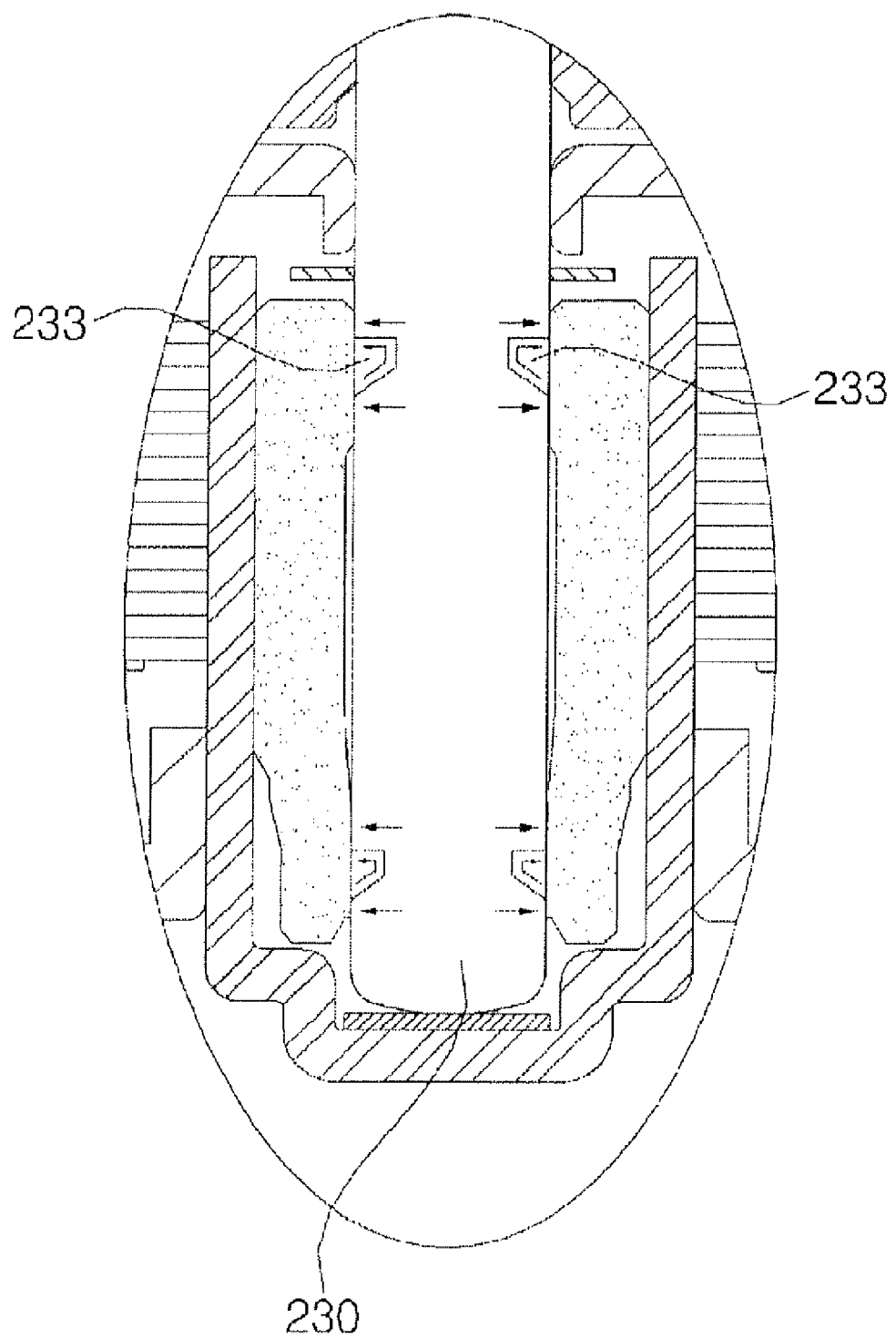
FIGS. 3 and 4 are enlarged views showing main components of a spindle motor according to other embodiments.
Figure 4:
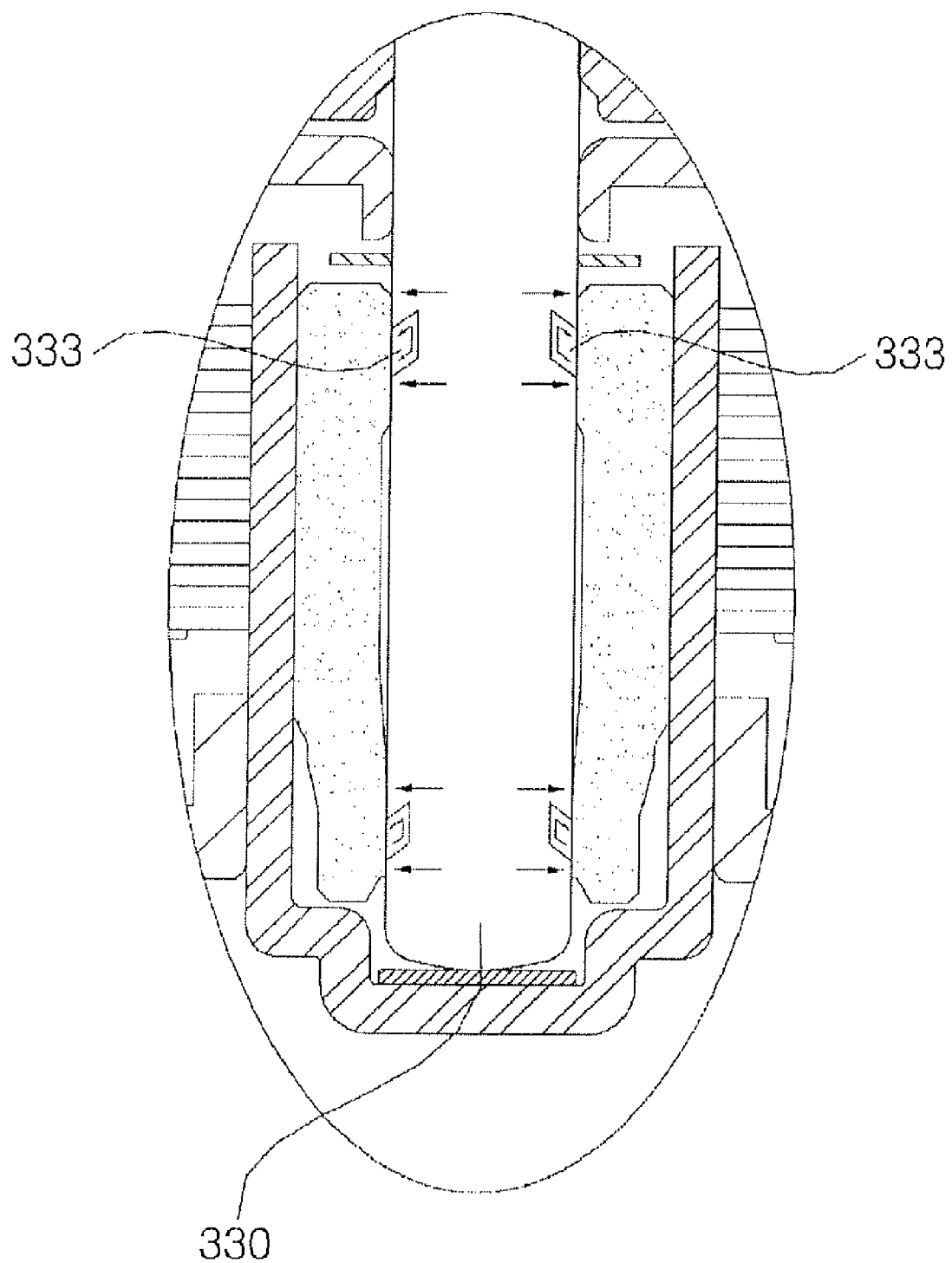

FIGS. 3 and 4 are enlarged views showing main components of a spindle motor according to other embodiments. Description will be made while focusing on the differences relative to FIG. 2.

As shown in FIGS. 3 and 4, recesses 233 and 333 formed in rotating shafts 230 and 330 can have angular sectional shapes.

The recess 233 shown in FIG. 3 includes a lower sidewall that is inclined upward toward the radial center of the rotating shaft 230, and an upper sidewall that is horizontally formed.

That is, the recess 233 has a trapezoidal sectional shape, so oil can be easily introduced into the recess 233 and can be easily discharged from the recess 233.

Although not shown in the drawings, the upper and lower sidewalls of the recess 233 can be horizontally formed. In this case, the recess 233 can be easily formed in the rotating shaft 230.

In addition, the recess 333 shown in FIG. 4 includes upper and lower sidewalls, which are inclined upward toward the radial center of the rotating shaft.

The recess 333 has a rectangular sectional shape, so oil can be easily introduced into the recess 333 and can be easily discharged from the recess 333.

As described above, in the spindle motor according to embodiments, the recess is formed along the outer peripheral surface of the rotating shaft making contact with the bearing.

Accordingly, the contact area between the bearing and the rotating shaft is reduced, so that friction between the bearing and the rotating shaft can be reduced. Thus, power consumption can be reduced when driving the spindle motor.

In addition, since oil that flows out from the bearing can be stored in the recess and then supplied again to the bearing, the oil can be inhibited from being leaked. Accordingly, it is possible to use the bearing for a long time compared to a spindle motor where oil leaks, so the life span of the bearing can be expanded.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A spindle motor comprising:
   a bearing housing;
   a bearing installed in the bearing housing, the bearing being formed with oil-impregnated pores;
   a rotating shaft rotatably installed in the oil-impregnated bearing and having a groove at a predetermined surface thereof facing the bearing;
   a stator installed around the bearing housing and having a core and a coil; and
   a rotor fixed to the rotating shaft and having a rotor yoke and a magnet,
   wherein oil leaving the oil-impregnated bearing is directly re-supplied to the bearing from the interfacial surface between the bearing and the rotating shaft.

2. The spindle motor as claimed in claim 1, further comprising a stopper around an outer peripheral surface of the rotating shaft above the bearing to inhibit oil from moving upward.

3. The spindle motor as claimed in claim 2, wherein the stopper is positioned lower than an upper surface of the bearing housing.

4. The spindle motor as claimed in claim 1, wherein the rotating shaft has a plurality of the grooves at predetermined surfaces thereof facing the bearing.

5. The spindle motor as claimed in claim 1, wherein the groove has a ring shape.

6. The spindle motor as claimed in claim 1, wherein the width of the groove, which is defined in a direction parallel to the rotating shaft, gradually reduces toward a radial center of the rotating shaft.

7. The spindle motor as claimed in claim 1, wherein a lower sidewall of the groove inclines upward toward a radial center of the rotating shaft.

8. The spindle motor as claimed in claim 1, wherein an upper sidewall of the groove is horizontally formed.

9. The spindle motor as claimed in claim 1, wherein an upper sidewall of the groove inclines upward toward a radial center of the rotating shaft.

10. The spindle motor as claimed in claim 1, wherein the stator is fixed to the bearing housing.

11. The spindle motor as claimed in claim 1, wherein a lateral side of the bearing housing is integrally formed with a bottom surface of the bearing housing.

12. The spindle motor as claimed in claim 1, wherein the groove is formed at a predetermined portion of the rotating shaft that makes contact with the bearing.

13. The spindle motor as claimed in claim 1, wherein a recess is formed at a predetermined surface of the bearing facing the rotating shaft, so that a gap is formed between the bearing and the rotating shaft.

14. The spindle motor as claimed in claim 1, wherein the bearing makes contact with the rotating shaft in at least two portions thereof, and the groove is formed in the rotating shaft at predetermined surfaces corresponding to the at least two portions.

15. A spindle motor comprising:
   a base;
   a bearing housing installed in the base;

a bearing installed in the bearing housing, the bearing being formed with oil-impregnated pores;

a rotating shaft rotatably installed in the oil-impregnated bearing and having a groove at a predetermined surface thereof facing the bearing;

a stator installed around the bearing housing and having a core and a coil; and a rotor fixed to the rotating shaft and having a rotor yoke and a magnet, wherein the rotor yoke surrounds the stator in an outer radial direction and wherein a portion of the rotor yoke is on a same horizontal plane as the groove.

16. The spindle motor as claimed in claim 15, wherein the groove is extended perpendicularly to an axial direction of the rotating shaft.

17. The spindle motor as claimed in claim 15, further comprising a stopper attached to an outer peripheral surface of the rotating shaft that protrudes upward from the bearing in order to inhibit oil from moving upward.

18. A spindle motor comprising:
a base;
a bearing housing installed in the base;
a bearing installed in the bearing housing;
a rotating shaft rotatably installed in the bearing and having a groove at a predetermined surface thereof facing the bearing;
a stopper attached to an outer peripheral surface of the rotating shaft that protrudes upward from the bearing;
a stator installed around the bearing housing and having a core and a coil; and
a rotor fixed to the rotating shaft and having a rotor yoke and a magnet,
wherein the rotor yoke surrounds the stator in an outer radial direction and wherein the stopper is disposed between the rotor yoke and the bearing.

19. The spindle motor as claimed in claim 18, wherein the groove is provided along an outer peripheral surface of the rotating shaft in a form of a ring.

20. The spindle motor as claimed in claim 18, further comprising a turntable fixed to the rotating shaft.

* * * * *